United States Patent [19]
O'Neill

[11] Patent Number: 5,507,420
[45] Date of Patent: Apr. 16, 1996

[54] REUSABLE HIGH EFFICIENCY PROPELLANT DRIVEN LIQUID PRODUCT DISPENSER APPARATUS

[75] Inventor: Paul J. O'Neill, Novato, Calif.

[73] Assignee: Aervoe-Pacific Company, Inc., Gardnerville, Nev.

[21] Appl. No.: 254,283

[22] Filed: Jun. 3, 1994

Related U.S. Application Data

[63] Continuation-in-part of Ser. No. 759,496, Sep. 12, 1991, abandoned, which is a continuation-in-part of Ser. No. 478,831, Feb. 2, 1990, Pat. No. 5,080,266.

[51] Int. Cl.$^6$ .................................................. B65D 83/14
[52] U.S. Cl. ........................... 222/635; 222/399; 141/20
[58] Field of Search .................... 222/635, 399, 222/402.1; 239/337, 340; 137/505.39, 505.36; 141/20

[56] References Cited

U.S. PATENT DOCUMENTS

| | | | |
|---|---|---|---|
| 3,478,933 | 11/1969 | Rousselot | 222/635 |
| 3,583,604 | 6/1971 | Marand et al. | 222/635 X |
| 3,615,042 | 10/1971 | Marand | 222/399 X |
| 4,174,811 | 11/1979 | Binder et al. | 222/399 X |
| 4,203,552 | 5/1980 | Hayes | 239/337 |
| 4,214,677 | 7/1980 | Bauer et al. | 222/635 X |
| 5,011,047 | 4/1991 | Cruysberghs | 222/399 X |
| 5,080,266 | 1/1992 | O'Neill | 222/635 |

*Primary Examiner*—Gregory L. Huson
*Attorney, Agent, or Firm*—Mark C. Jacobs

[57] ABSTRACT

A reusable high efficiency propellant driven apparatus for the dispensing of liquid products, featuring a refillable product container, and a rechargeable propellant housing. The propellant housing may be moved from container to container, to dispense a plurality of products; and a non-completely dispensed container can have the product exhausted by the replacement of a spent propellant housing, with the same or a different housing that does contain propellant. The housing is disposed concentric to the container and preferably both are secured to a single cap. A dual piston construction is employed to provide a hermetically sealed propellant housing. Product and propellant deployment is controlled by the movement of a pair of gaskets.

39 Claims, 9 Drawing Sheets

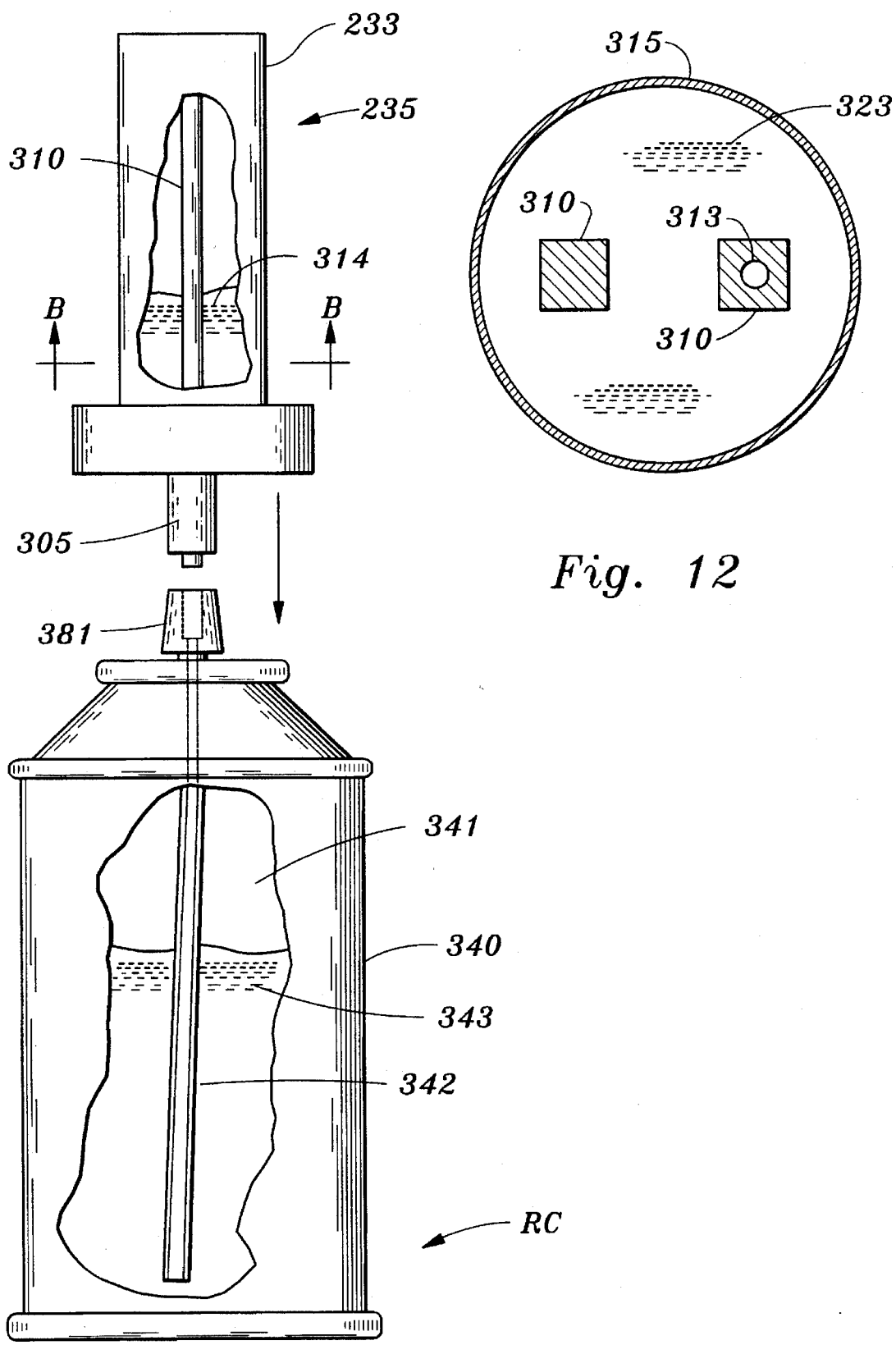

REUSABLE HIGH EFFICIENCY PROPELLANT DRIVEN LIQUID PRODUCT DISPENSER APPARATUS

This application is a continuation-in-part of Ser. No. 759,496 filed Sep. 12, 1991 now abandoned which in turn is a continuation-in-part of Ser. No. 478,831, filed Feb. 2, 1990 by Paul J. O'Neill, now U.S. Pat. No. 5,080,266 issued Jan. 14, 1992.

BACKGROUND OF THE INVENTION

Aerosol dispensers have been available for a number of years for the application of hair sprays and other personal care products, as well as for paints, lubricants, insecticides and a multitude of other liquid products.

In the earlier days of aerosol marketing, "Freon" blends were widely used as propellants, principally because they were not flammable and were relatively nontoxic. However, in recent years, it was discovered that "Freons," when released into the atmosphere, migrated to the upper stratosphere and contributed to the depletion of ozone. Since ozone shields the surface of the earth against penetration of solar ultraviolet radiation, the use of "Freon" propellants was believed by many to have contributed to climate changes, as well as to an increased incidence of skin cancers and cataracts. Accordingly, the U.S. Environmental Protection Agency (E.P.A.) banned the further use of "Freon" propellants. This forced aerosol packagers to select from alternative propellant systems, all of which had serious disadvantages. One class of propellants were the various hydrocarbons, consisting of blends of propane and butane mixtures. However, such hydrocarbon propellants are extremely flammable, and being volatile organic compounds they contribute to lower atmospheric air pollution. Therefore it is deemed desirable to reduce their usage from the conventional one part hydrocarbon propellant to three parts product on a weight basis. Two alternative propellant systems to hydrocarbons involve the use of hydrochlorofluorocarbons (HCFC's) and dimethylether. However, such propellants are extremely expensive and, in the case of dimethylether, flammable. Therefore a system which minimizes the amount of such propellants being utilized is deemed desirable.

In addition to the selection of a gas propellant, further problems in the aerosol packaging industry resides in the disposition of the used aerosol containers, particularly for large scale commercial users. After the product has been consumed, the container remains charged with some amount of the propellant. If the propellant is a flammable gas, the container is considered hazardous waste, even when the product is a water-based liquid.

OBJECTS OF THE INVENTION

It is an object of this invention to provide a liquid dispensing apparatus to be operated with a gaseous propellant which is self-charging for extended life.

It is a further object of this invention to provide a liquid dispensing apparatus which enables the complete evacuation of a liquid product at a relatively uniform discharge rate.

It is a further object of this invention to provide a device for dispensing an aerosol product that uses a propellant gas at a regulated and relatively constant pressure.

It is a further object of this invention to provide a liquid dispenser with a gaseous propellant wherein the liquid product and the gas propellant are kept separated up to the point of delivery at the spray head.

It is a further object of this invention to provide a liquid container with a gas propellant device, which is easily separated from the container at evacuation of the product for complete disposal of hazardous materials.

Another object of the invention is to provide a unique automatic valve gasket seal loading.

Another object of the invention is to provide a unit which, when the liquid propellant is spent, the system automatically self-vents to allow flammable propellant gases to escape rather than be retained in the container.

Other objects of the invention will in part be obvious and will in part appear hereinafter.

The invention accordingly comprises the apparatus possessing the features properties and the relation of components which are exemplified in the following detailed disclosure and the scope of the application of which will be indicated in the appended claims.

For a fuller understanding of the nature and objects of the invention reference should be made to the following detailed description, taken in conjunction with the accompanying drawings.

SUMMARY OF THE INVENTION

In carrying out this invention, I provide a gas dispensing spray unit which is easily attached to and separated from a standard container for liquids and other flowable materials. The unit includes a pressurized liquid propellant chamber which is initially charged with a quantity of a highly compressed gas. The liquid propellant chamber is connected to a pressurized gaseous propellant chamber through a pressure valve. The propellant in the two chambers is under substantially the same pressure. The difference in the thermodynamics is the factor causing the difference in the state of the propellant fluid. The pressure valve recharges the pressurized gas chamber when the pressure therein falls below a set threshold level.

Both the high and the low pressure propellant chambers are in sealed isolation from the liquid product that is carried in the container in embodiments 1 and 2. In the third embodiment, both the liquid and the gaseous propellant chambers are in sealed isolation from the liquid product that is carried in the container. A spray head includes a gas flow passageway that opens into the gas chamber and a liquid flow duct that extends down into the liquid product. When the spray head is depressed, it opens valves to allow the previously separated liquid product and the gas propellant to flow up and merge at a venturi discharge opening whereby the gas propellant projects the liquid product out in a spray.

The spray pattern may be altered for products of differing viscosities by varying the regulated pressure provided by the pressurized gas chamber.

BRIEF DESCRIPTION OF THE DRAWINGS

FIG. 11 is a figure similar to FIG. 7 for use with the third embodiment of this invention, FIG. 12 is a sectional view taken along line B—B of FIG. 8.

DESCRIPTION OF THE PREFERRED EMBODIMENT

Figure 1:
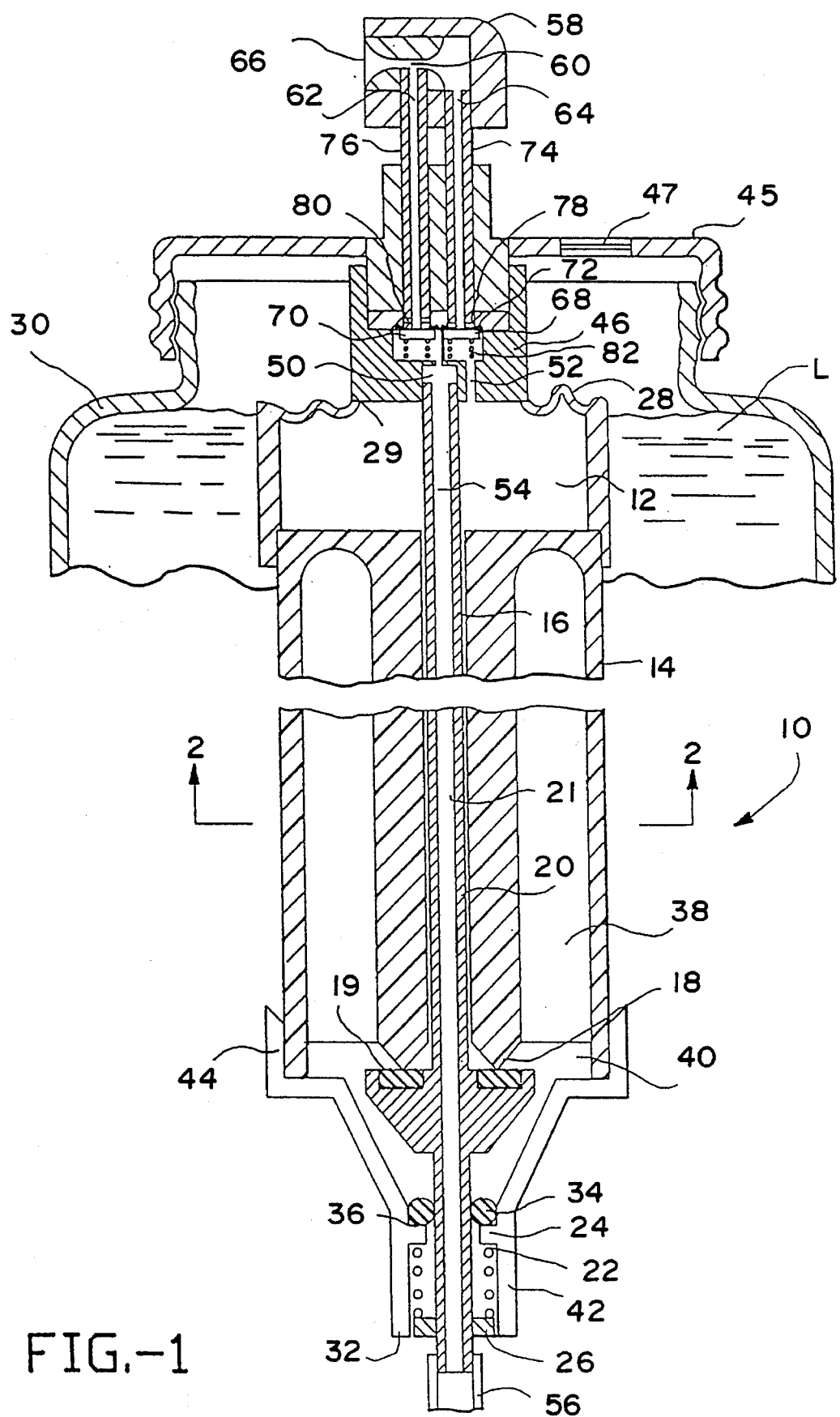
FIG. 1 is a partial section view of the first embodiment of propellant delivery apparatus of this invention.

Referring not to the drawing with greater particularity, the gas-propelled liquid dispensing device 10 of this invention's first embodiment as per FIGS. 1 through 4 includes a low pressure chamber 12 for the gas propellant, which is preferably a gaseous carbon dioxide (CO2) at a moderate pressure of approximately 40 to 70 PSI, and high pressure vessel 14, which is charged with a liquid or gaseous CO2 or other compressed gas at a pressure of 500 to 1,000 PSI at 70 degrees Fahrenheit. The high pressure chamber 14 communicates with the low pressure chamber 12 through a central passageway 16 which is normally closed by a pressure-reducing regulator valve 18 carried on a valve stem 20 sealing against a suitable seat 19.

The valve stem 20 is biased downward to open the valve 18 by a spring 22 acting between a shoulder 24 in the valve body 10, and an adjustment collar 26 carried on the valve stem 20. The adjustment collar 26 may be selectively positioned along the valve stem 20 to adjust the force of the spring 22 which opens the valve 18. Pressure of the gas within the low pressure chamber 12 acts against a flexible diaphragm 28, which is sealed and secured at 29 to a guide 46 for the valve stem 20 to pull the stem 20 upwardly against the spring 22, tending to close the valve 18. Hence, the moderate gas pressure within the chamber 12 may be regulated as desired to a level of approximately 40 to 70 PSI by adjustment of the spring 22. When the pressure in the gas chamber 12 falls below the set level, the valve 18 is opened by the spring 22 to admit more gas until the gas pressure acting against the diaphragm 28 is sufficient to again close the valve 18.

It is to be noted that the stem 20 extends out of the pressure chambers 12 and 14 at both ends so that the axial forces acting on the stem 20 remain balanced despite any pressure variations in the liquid CO2 or other compressed gas resulting from temperature variations, and of course for depletion of the compressed gas.

Before the propellant device 10 is applied to the container 30 for a liquid product L, it is charged with highly compressed CO2 or other propellant gas in a manner to be described. A charging nozzle (not shown) is applied to the fill port 32 at the bottom of the unit to introduce liquid CO2 or gas into the interior. Since the charging pressure is at several hundred PSI above the maximum intended pressure of the CO2 or other gas at design temperature, the rubber O-ring 34 which functions as a one-way valve is forced away from its seat 36, sealing between shoulder 24 and the valve stem 20 to admit the liquid CO2 or other gas. Then, when the high pressure chamber 14 is charged and the charging nozzle is removed, the pressure within the container 14 forces the O-ring 24 back to prevent any outward flow. The introduction of the compressed gas at a pressure several hundred PSI above the design pressure serves to proof test the device 10 in the course of production line charging.

Figure 2:
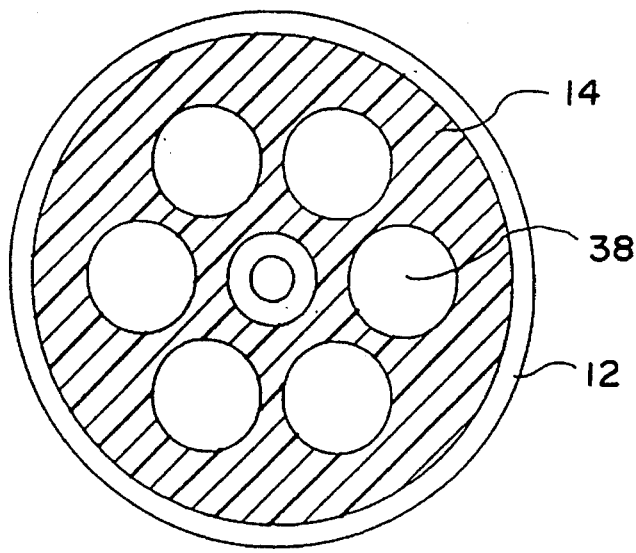
FIG. 2 is a section view taken along line 2—2 of FIG. 1.

The high pressure vessel 14 may be reinforced and encased to a metal jacket or, as shown, it may actually comprise a series of cylindrical chambers 38 molded in a body 14 of plastic or the like, as shown in FIG. 2. A clearance 40 below the cylindrical chambers brings them all into communication for uniform flow past the valve 18. The charging head 42 of the gas propelling valve device 10 has an upper cup 44 that receives the high pressure vessel 14. 27 The discharge head 46 of the unit 10 preferably carries some means such as a threaded cap 45 for attachment of the unit 10 to a conventional liquid container such as a bottle 30. A rupture plate 47 may be provided in the cap 45 so that in the event of excessive pressure in the bottle 30, as from a leak in the unit 10, the plate 47 will rupture and relieve the nonflammable, nontoxic CO2 gas to the surrounding atmosphere.

Separate liquid product and gas propellant ducts 50 and 52 are provided in the discharge head 46. The gas propellant duct 52 opens directly from the low pressure chamber 12, and the liquid product duct 50 opens into communication with a central liquid passageway 54 through the valve stem 20. The dip tube 56 of plastic or the like is attached to the bottom of the valve stem 20 to draw liquid from the bottom of the container through the axial flow passageway 21 and ensures complete evacuation the container 30.

The spray head actuator 58 has a venturi restriction 60, and a liquid duct 62 opens to the low pressure zone at the restriction. The gas duct 64 opens to the back of the venturi restriction to project a spray of liquid out of the nozzle 66.

When the spray head actuator 58 is depressed, gas and liquid valve members 68 and 70 are moved from their seats 72 so that the tubular actuators 74 and 76 are opened to gas and liquid flow, respectively, through ports 78 and 80, the valves being closed by springs 82. Preferably, the ports 78 and 80 are staggered axially (FIG. 4) so that gas flow begins slightly before liquid flow commences and terminates shortly after liquid flow ceases. This ensures good initial product atomization and complete product evacuation from the nozzle orifice when the spray head actuator is released. On the other hand, the ports 78 and 80 could be staggered so that the port 80 opens first and the liquid flow tube is opened to atmosphere before gas flow draws the liquid L up the tube. This air input would tend to replace the volume of gas previously drawn off and reduce the likelihood of a vacuum being created within the container 10, which might tend to collapse it.

Figure 3:
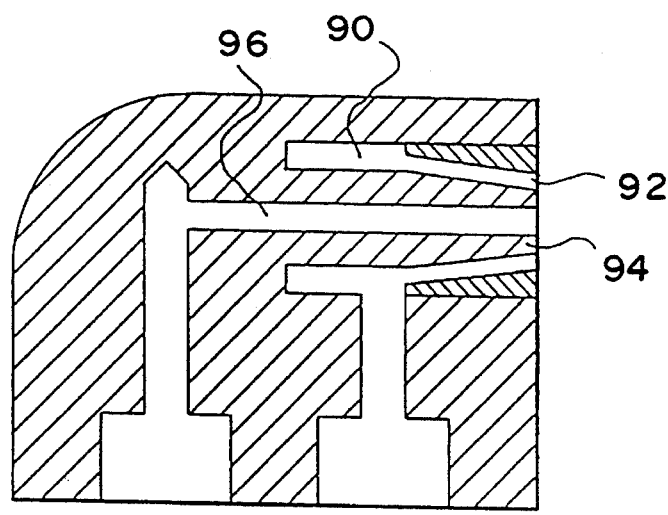
FIG. 3 is an enlarged section view of an alternate form of venturi design.
Figure 4:
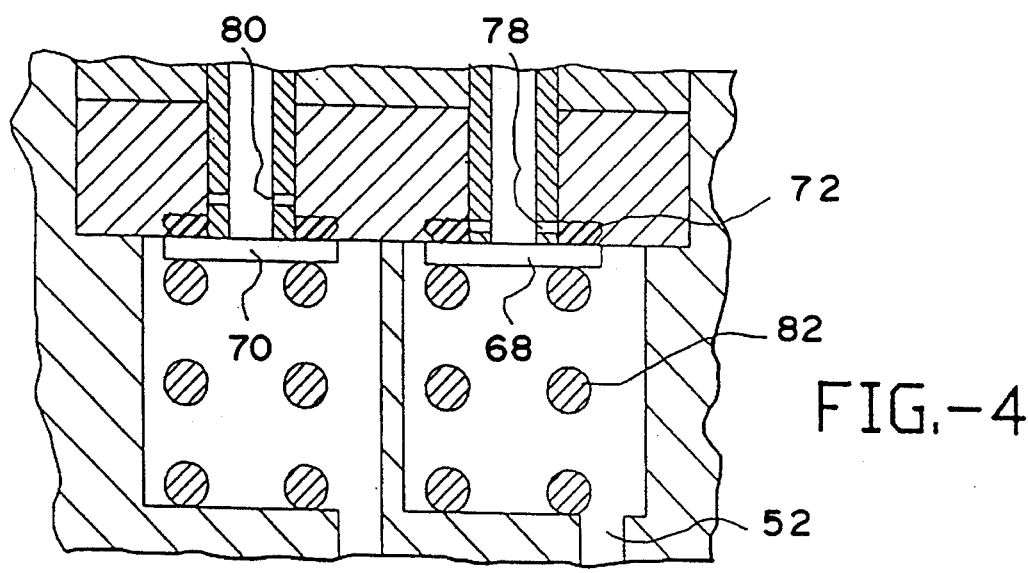
FIG. 4 is an enlarged section view of the discharge head.

Referring now to FIG. 3, there is shown an alternate venturi design wherein the gas jet from the chamber 90 exits through an annular nozzle 92 around a central core 94. The liquid product is introduced to a liquid flow passageway 96 through the core 94 in the center of the annular gas jet.

Figure 5:
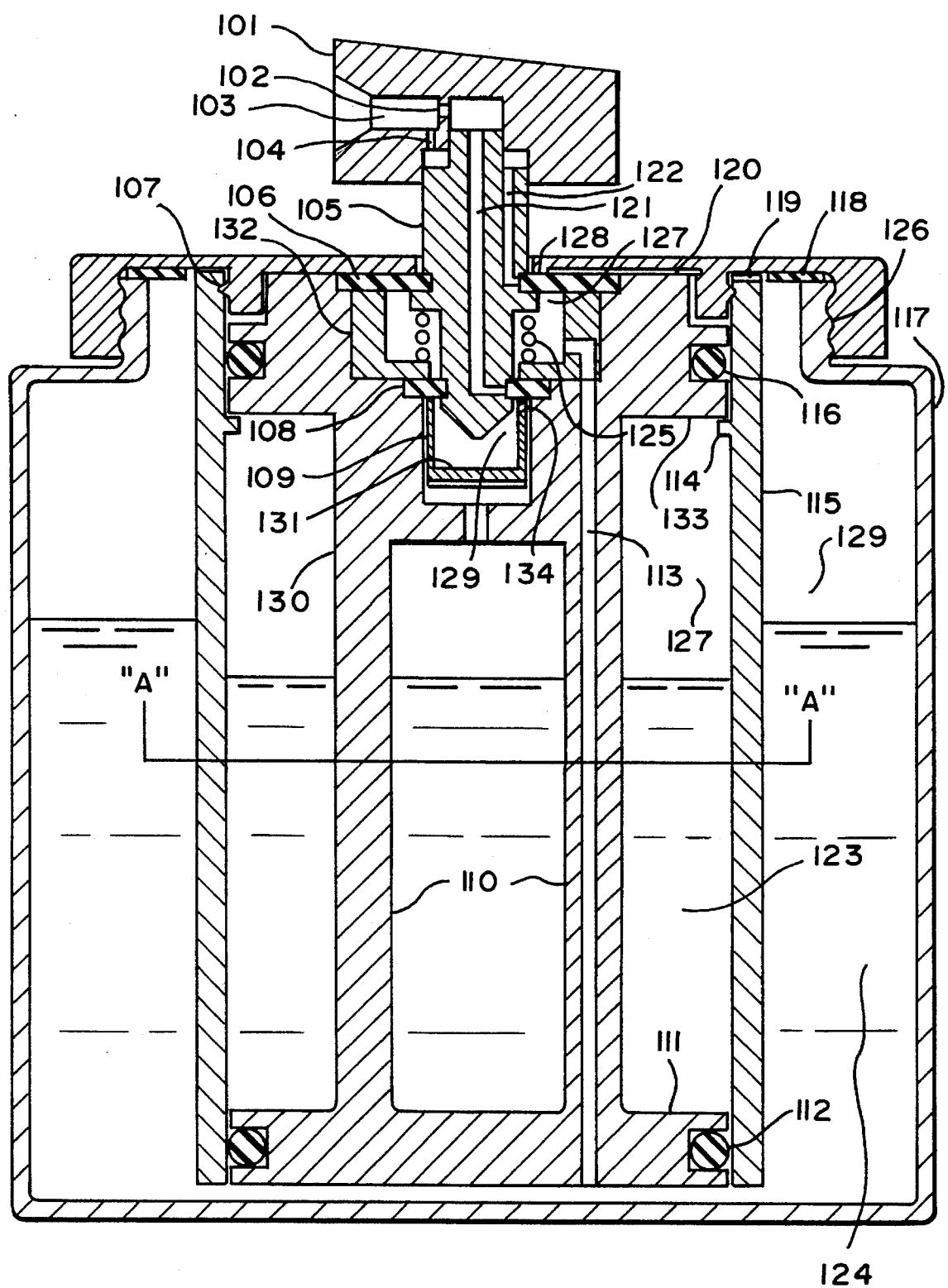
FIG. 5 is a cutaway view of a second embodiment of the dispensing apparatus.
Figure 6:
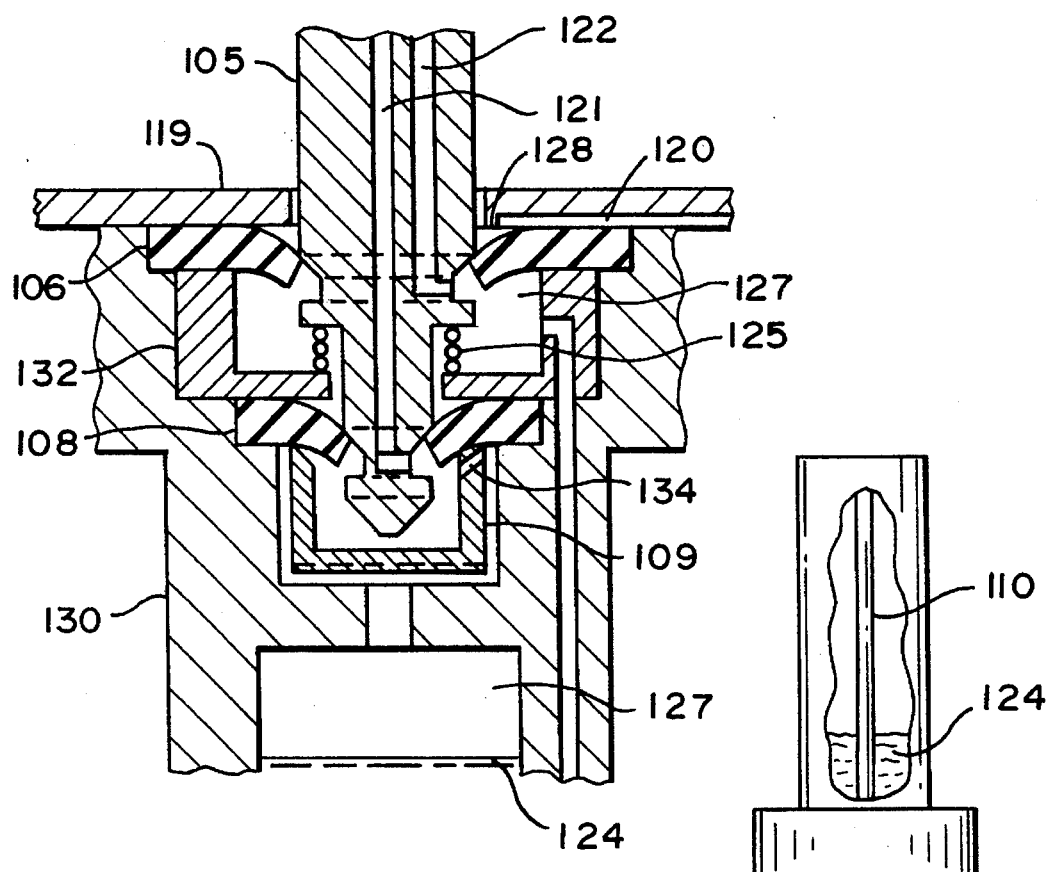
FIG. 6 is a cutaway detail view of the second embodiment of the apparatus with the valves open for propellant and product.
Figure 7:
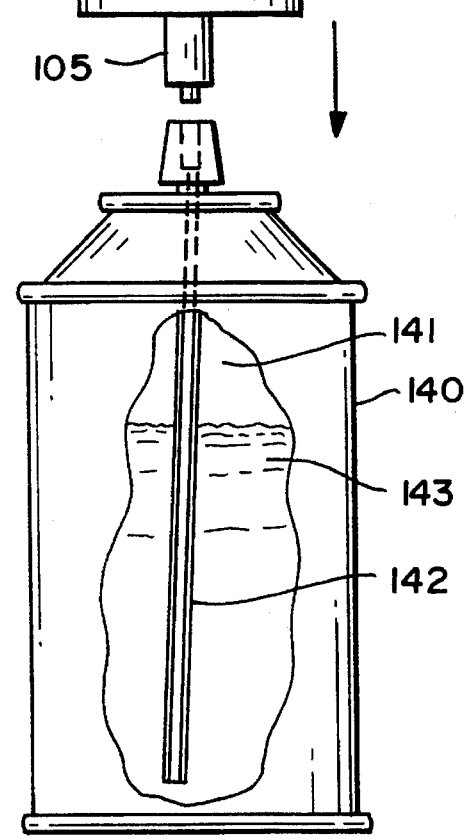
FIG. 7 is a cutaway view of a recharging apparatus, suitable for embodiment 1 and 2.

The second embodiment of this invention is discussed with respect to FIGS. 5, 6 and 7. Let us turn first to the cutaway view as shown in FIG. 5. The spray actuator 101 assembles to the spray stem 105 through a slight friction fit as shown at 135 and 136 on the outside diameter of the stem 105 and on the smaller coaxial diameter. This fit assures a hermetic seal to segregate the gaseous propellant, which is routed to the spray head through channel 121, and the product, which is routed to the spray head through channel 122. The spray actuator 101 includes an acceleration chamber 102 for propellant. This acceleration chamber communicates with the venturi expansion chamber 103 which is a tapered cylindrical chamber that allows the stream of propellant gas and liquid product to expand gradually, resulting in a fine atomization of the liquid product. The spray actuator incorporates a venturi vacuum generating system. This consists of the acceleration chamber 102 and the venturi expansion chamber 103. As propellant gas accelerates through orifice 102, a vacuum is created at the intersection of chamber 103 and fluid conduit orifice 104, thus drawing liquid product up through the connecting channels 122, 127 and 113.

The system is actuated by downward finger pressure on the spray actuator 101 and associated stem which causes compression of spring 125 and opens valve gaskets 106 and 108, respectively, by virtue of the outward flexing of the gaskets' inner diameters away from the tight radial engagement of these flat gaskets and their respective circular stem seats, as shown in FIG. 6. The resulting action opens a fluid path from the fluid conduit 122 to fluid chamber 127 via conduit 113 and opens a path between propellant conduit 121 and chamber 128.

Further, the valve action simultaneously causes the sealing point 128 to open from the downward flex of gasket 106 and allows air to flow through channel 120 into the region above the liquid product storage area 129. The purpose of this is to maintain a neutral atmospheric pressure on the liquid product as it is withdrawn through use.

The structure of the apparatus includes snap-fit assembly by a slight interference tongue and groove design which provides an integrated assembly in production. The structure of the apparatus further includes housing 135 having a core 130 including tenons 110 floating in propellant housing 115 with O-rings 112 and 116 forming a hermetic seal therein. Detent 114 provides a stop for the snap-fit assembly. The apparatus is inserted in a product container and removably sealed by a threaded closure 126 and sealed by gasket 118. The only load on this assembly point is that created by the slight compression of gaskets 106 and 108 to provide a sealing relationship with the core 130. It should be noted that the forces created by the liquified propellant are contained between the upper and lower pistons of the core 130, areas 111 and 133. This is unique in that this relatively high static load which is created by the propellant vapor pressure is not transferred to any kind of an assembly fit but rather is contained by the integral structure of two sealing pistons 111 and 133 of the core 130 and the housing 115.

The liquid propellant 24 may be any of a wide range of liquified gases in the range of 100 lbs. to perhaps 250 lbs. For purposes of this invention, propane is used which has a vapor pressure of 108 PSI at 70 degrees Fahrenheit. Gases of higher or lower vapor pressures may be used with equal effectiveness.

This floating fixed orifice device serves to reduce the propellant gas pressure to a lower valve determined by the slot dimensions at 134. This cup shaped device is held in intimate contact with gasket 108 by the out rushing flow of gaseous propellant while valve is activated. The result of the pressure reducing effect contributes to the greater efficiency of the propellant gas as a higher pressure at the venturi orifice and progressively decreases the vacuum and corresponding yield of fluid delivered at the spray head 101. It has been found that a propellant gas pressure in the range of 40 PSI provides the optimum results. The pressure reducing valve 109 also serves the function of providing free flow of propellant when the unit is initially charged or subsequently recharged. The flow of gas/liquid propellant entering the unit urges pressure reducing valve 109 away from its sealing position on gasket 108 and thus provides free flow of the entering propellant. Pressure reducing valve 109 has an angled face at point of contact with gasket 108. The purpose of this is to maintain a constant clearance relationship at the metering slot as gasket 108 is flexed downward during usage. A further novel feature of this regulating device 109 is that it can provide a two-stage delivery of gas and consequently of product. By setting the distance between surface 131 and the bottom of the spray stem 105 to a select dimension, the initial opening of the valve stem 105 will provide the restricted flow through the restricting valve 109. However, on further depression of the valve stem, its conical bottom contacts surface 131, urging valve 109 away from sealing gasket 108, thus opening a full flow gap for the propellant gas at a higher flow rate.

Another novel feature is that upon expiration of the liquid propellant, the pressure against spring 125 is diminished so that the remaining gaseous propellant will be allowed to escape. The result is that the apparatus is self-evacuating, yet still rechargeable.

The discussion now turns to the third embodiment as seen in FIGS. 8 through 12. In the first embodiment, now the subject matter of U.S. Pat. No. 5,080,266, the thrust of the technology was to regulate the pressure of a relatively high vapor pressure propellant, e.g., carbon dioxide. Now in this third embodiment, lower pressure propellants are to be employed, so no effort is needed to regulate the pressure. A typical lower pressure propellant would be the lower alkane gases such as propane and butane, as well as isobutane. Other propellants include dimethylether and tetrafluroethane.

As will be discussed in detail, the big difference between embodiment 2, i.e., FIG. 5 and embodiment 3, FIG. 8 is how the propellant is delivered from the contained space through the center of the stem. Product delivery in both embodiments is the exact same.

Reference is now made to FIG. 8 et. seq., commencing at the top wherein it is seen that the gas propellant liquid dispensing apparatus of this third embodiment includes a spray actuator 210 which is connected to a spray stem 236 by a fraction fit as is shown at 244 on the outside diameter of the stem, 255 and at 241 the smaller coaxial diameter. This fit assures a hermetic seal to segregate the gaseous propellant, which is routed to the spray head actuator 210 through channel 214, and the product, which is routed to the spray head through channel 213.

The spray actuator incorporates a venturi vacuum generating system, which consists of an acceleration chamber i.e., venturi orifice 211 and the venturi expansion chamber 237. The spray actuator 210 includes an venturi orifice 211 for propellant which communicates with the venturi expansion chamber 237 which is a tapered cylindrical chamber that allows the stream of propellant gas and liquid product to expand gradually, thereby resulting in a fine atomization of the liquid product. As propellant gas accelerates through orifice 211, a vacuum is created at the intersection of chamber 237 and the fluid conduit orifice 212 which vacuum draws liquid product up through the connecting channels 213, and 225, the product feed channel and the chamber 243 interposed therebetween.

Figure 10:
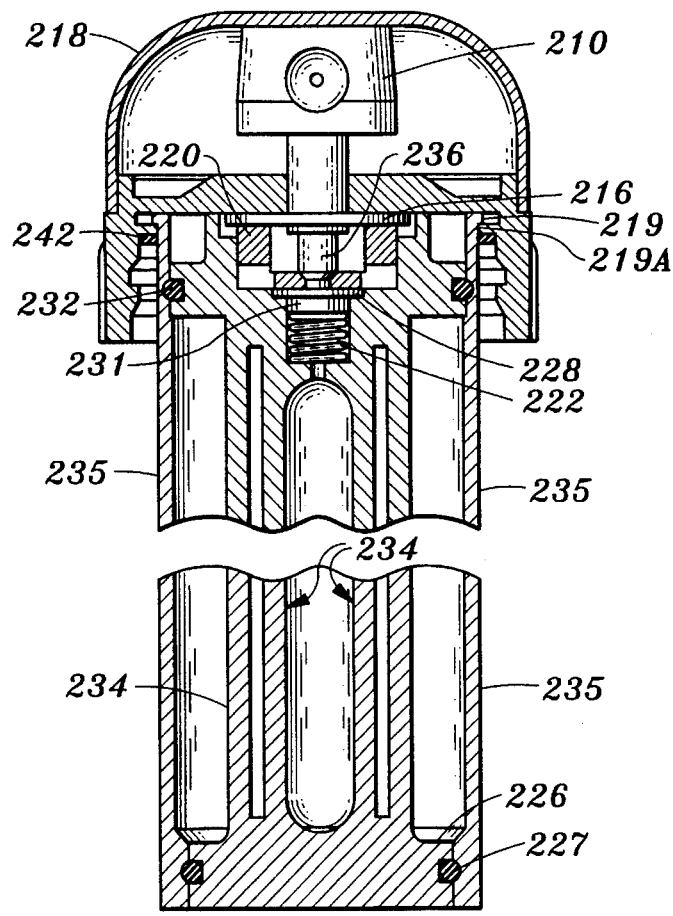
FIG. 10 is an elevational view of a portion of the third embodiment as seen in FIG. 8 and also including a removable protective cap.

The structure of this apparatus is assembled by pressure fitting the various components together to provide an integrated assembly. Reference may also be made to FIG. 10. This includes core 226 having spaced parallel tenons 234. This core 226 also includes an upper piston 221 and a lower piston 240, details of which will be set forth later. The core is disposed within an annular propellant housing 235 which has an interior space designated 258. O-rings 232 and 227 form a hermetic seal against the inner surface of propellant housing 235, of said o-rings being disposed within an upper piston 221 and the other o-ring being within a lower piston 240 each piston being at opposite ends of said tenons.

Figure 8:
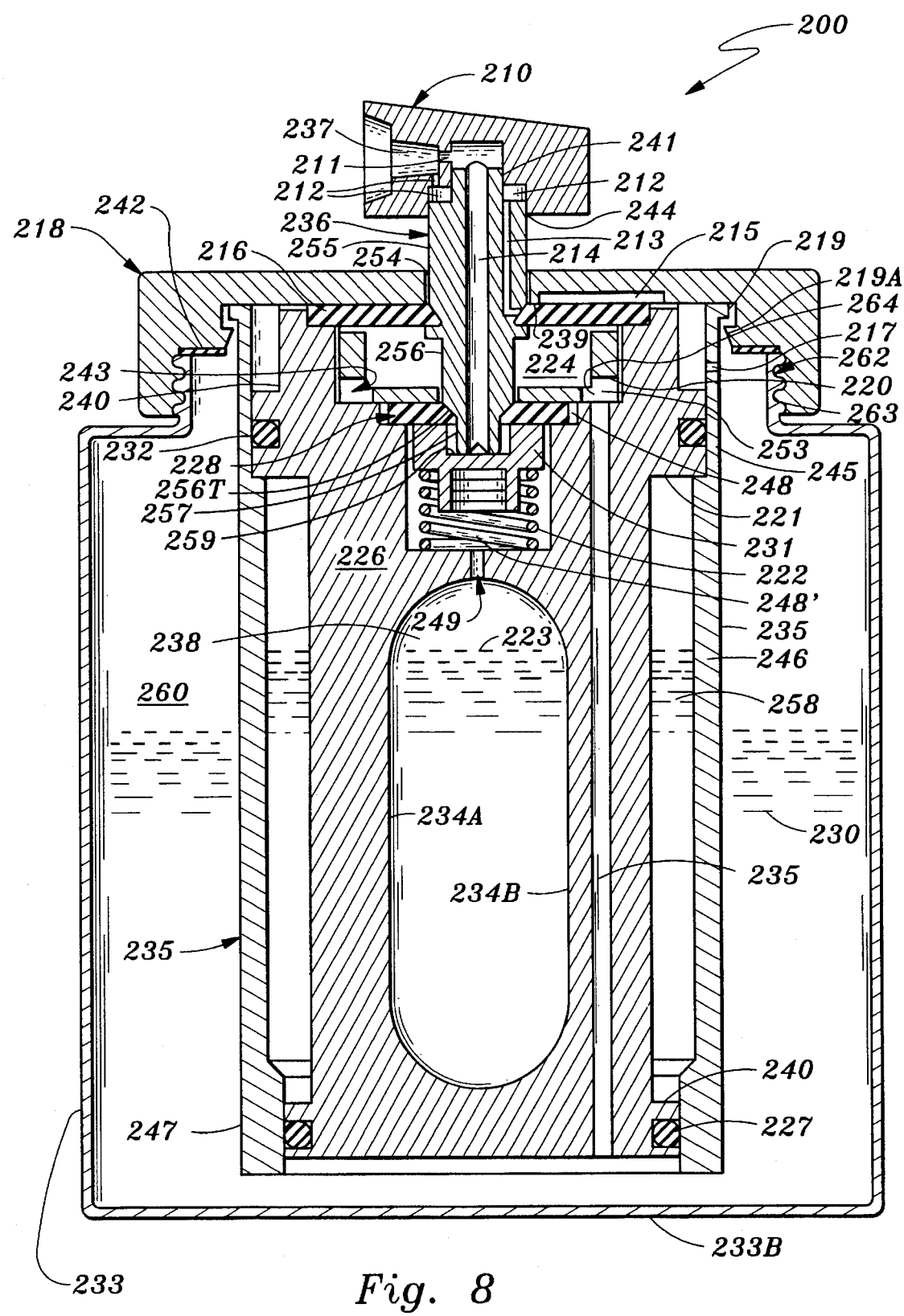
FIG. 8 is a cutaway view of a third embodiment of the dispensing apparatus of this invention.

In FIG. 8 it is seen that the annular housing 235 has three different cross section diameters or thicknesses that affect the size of its interior 258. The first 245 is the narrowest. The upper edge, i.e., the commencement point of the second diameter 246 serves as a detent for the upper piston 221. The lower piston 240 which is of a smaller diameter then the upper piston per FIG. 8, is frictionally fit across the third diameter 247 of housing 235.

It is seen that o-ring 227 rub against this third portion which is of the greatest thickness. Thus, it can be said that the core 226 is suspended within the housing, since the core does not touch the bottom of the container 233B. Lateral motion is, however, prevented due to the close fit of the lower piston to the third portion of the housing.

One of the core 226's tenons, here 234B and the lower piston 240 contain a long aligned bore 225 which serves as a product delivery channel, to move about which will be discussed infra.

The core 226 comprising the two spaced tenons, 234A & B having a piston on each end thereof; namely, 221 the upper piston and 240 the lower piston respectively, also has a sealing seat configured as a propellant valve shut off cup, 231 disposed in the top of the upper piston 221. This shut off cup 231 is preferably formed as by molding for fit within the upper piston in the manner to be described.

Disposed within the larger diameter upper piston 221 is a conventional O-ring 232. While disposed within the smaller diameter lower piston 240, is conventional O-ring 227. The basis for the difference in diameter of the two pistons will be discussed below.

Chamber 243 extends downwardly into the core 226 from its upper surface and the chamber includes a centrally disposed throat 248 of an intermediate cross section that depends downwardly and which in turn communicates with a downwardly depending depression in fluid communication with a bore 249 for fluid communication to the headspace 238 of the interior confines 235H of housing 235 for ultimate propellant delivery.

A seal gasket spacer 220 with a central opening 265, which spacer is open at the top has an interior designated 224 fits into and is in fact disposed in the chamber 243. When so disposed, a passageway 253 remains beneath the sidewall 220S and adjacent the base 220B as designated in FIG. 9 rather than in FIG. 8 for ease and simplicity. The intermediate diameter section of said spray stem 236 passes through central opening 265.

Bore 225 within the tenon terminates in fluid communication with passageway 253 formed by the placement of said spacer within the chamber 243, and in turn passageway 253 communicates with an even tinier passageway 264 formed during the molding of the spacer and seen on the right side of FIG. 8, for fluid communication with said spacer's interior chamber 224. Thus the flow goes via 225, to 253 to 264 to 224.

The core 226 is disposed in a product container 233 and removably closed off a threaded closure 218 and sealed by gasket 242. It should be noted that the forces created by the liquified propellant are contained between the upper and lower pistons 221 and 240 of the core 226. The relatively high static load which is created by the propellant vapor pressure is not transferred to any kind of an assembly fit but rather is contained by the integral structure of two sealing pistons 221 and 240 of the core 226 and the housing 235.

Figure 9:
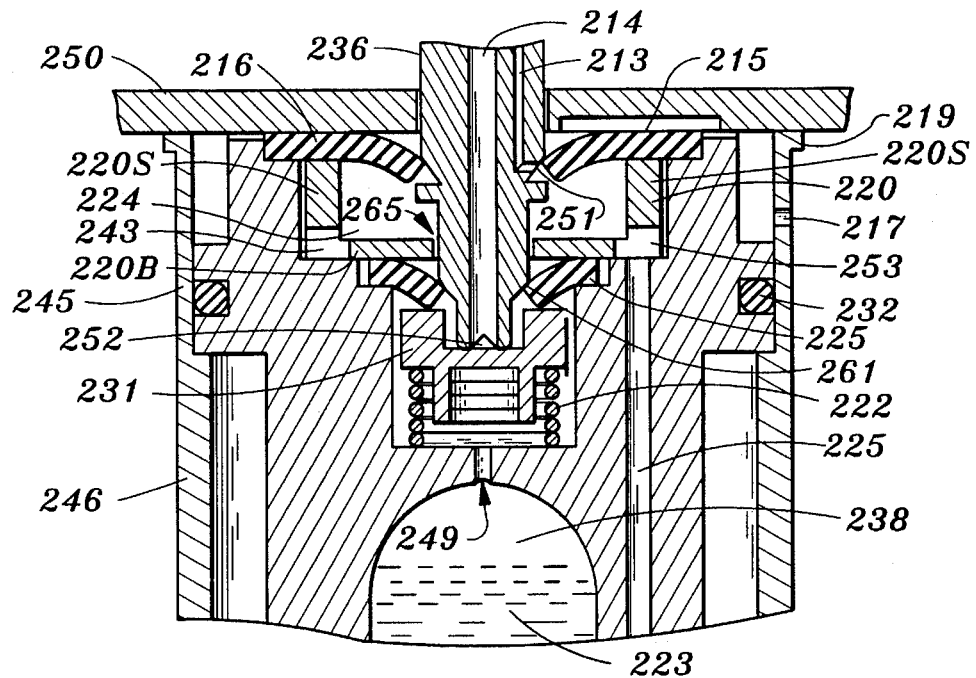
FIG. 9 is a cutaway detail view of the third embodiment with the valves in open position for both propellant and product.

The reader is now referred to FIG. 8, 9 and 10. FIG. 8 depicts the actuator 210 prior to the application of pressure from the user's finger, whereas FIG. 9 shows the position of various elements when pressure is being applied, i.e., product is being delivered. FIG. 10 is an elevational view of a portion of this embodiment, i.e., without the housing somewhat akin to FIG. 8, but the actuator is rotated for viewing of its front rather than its side as is seen in FIG. 8.

It is seen therefore that actuator 210 disposed above threaded cap 218 is removably disposed upon spray stem 236 which extends upwardly through a central opening 254 in said cap 218. Spray stem 236 carries a product gasket 216 such as a black rubber gasket that itself seals against the underside of cap 218 when spray stem 236 upper section 255 is properly disposed. Spray stem 236 includes a propellant delivery channel 214 and a product delivery channel 213.

As see in FIG. 8, and FIG. 9 the spray stem 236 includes three sections, the upper 255, the intermediate 256, and the lower 257. The upper section 255 of spray stem 236 is on the largest diameter. A portion of this largest section is disposed beneath the gasket 216. Abutting this largest diameter section is an intermediate section 256, which may have a chamfered lower edge to achieve a taper. Mounted on this intermediate section is a seal gasket spacer formed of white plastic. Disposed upon the intermediate section 256 at its locus beneath spacer 220 is an annular propellant gasket 228 of a smaller diameter than the earlier mentioned gasket.

As can be seen the spray stem 236 also includes a third or lower section 257 which comes to a V-groove edge at the lower end thereof. Channel 214 is situated straight through all three sections of said spray stem to communicate with venturi orifice 211.

The disposition of lower most section 257 is such that on actuation of actuator 210, section 257 will move downwardly and impinge upon a sealing seat, 231 which is cup-shaped and serves as a propellant valve shut off means. The reader is urged to contrast FIG. 8 with FIG. 9 for the two positions in which element 257 can be situated. This seat 231 is nested within a coil spring 222 disposed therebeneath. This coil spring 222 resides within the downwardly extending cylindrical depression 248' beneath the throat 248 of chamber 243. Channel opening or bore, 249 communicates between the propellant head space 238 above propellant 223 and said depression 248' for the ultimate delivery of propellant in the manner to be described below.

As noted earlier, channel 225 is for the delivery of product from outside of the core 226, i.e., that volume between the core and the wall of the container 233. Channel 225 communicates with passageway 253, which passageway is molded into spacer 220, during its formation. This passageway in turn communicates with space 243, such that when actuator 210 is in the down position as in FIG. 9, product can then flow from the container confines 230, up the product channel 225 in the tenon, through passageway 253 into the interior 224 of the spacer 220 disposed within space 243 through product flow port 251, (per FIG. 9) up the product delivery channel 213 in the spray stem 236 across 212, out orifice 212' to the venturi expansion chamber 237 for ultimate delivery of product.

The flow of propellant will be described next. Prior to describing the propellant fluid flow, however, it is important to understand the disposition of several interacting elements involved in the structure at hand. Reference should be made to FIGS. 8, 9, and 10. It is seen that the actuator 210 is mounted upon the valve stem 236 (spray stem) by press fit as mentioned earlier. Note how stem 236's upper section 255 with the greatest diameter passes through an unnumbered opening in the product valve gasket 216.

Note also that the middle section 256 of said valve stem 236 has an intermediate diameter which is narrower than the diameter of upper section 255 but it is the lowermost section 257, and not the middle section 256, that receives and retains propellant annular valve gasket 228 thereupon. The tapered area 256T rests on the propellant gasket and serves to prevent the gasket 228 from rising.

Interposed between these two gaskets is a spacer, designated the seal gasket spacer 220. Suggested sizing for this spacer is about ¼ inch in elevation by about ¾" in diameter. This spacer 220 includes the passageway 253 for communication to the interior chamber 243 of said spacer.

The valve stem 236 also includes a lower section 257 previously referred to, which protrudes through propellant gasket 228. This lower most section 257 is disposed within the sealing seat 231, which in turn is nestled into coil spring 222. The seat in turn is disposed within the depression 248' of throat 248 of the core 226.

Figure 13:
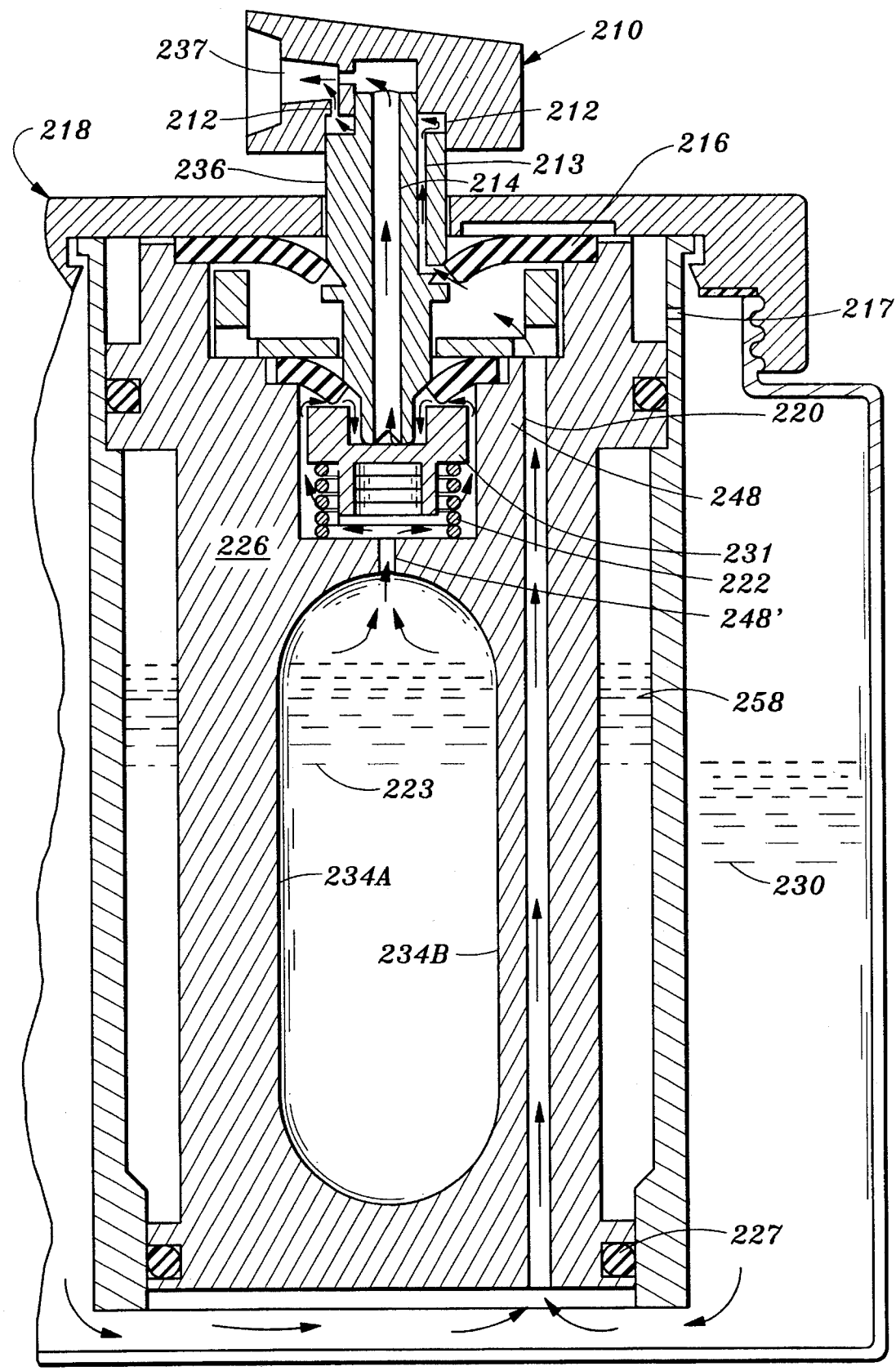
FIG. 13 is a simplified version of FIG. 8 to specifically depict the flow path of both the product and the propellant.
Figure 14:
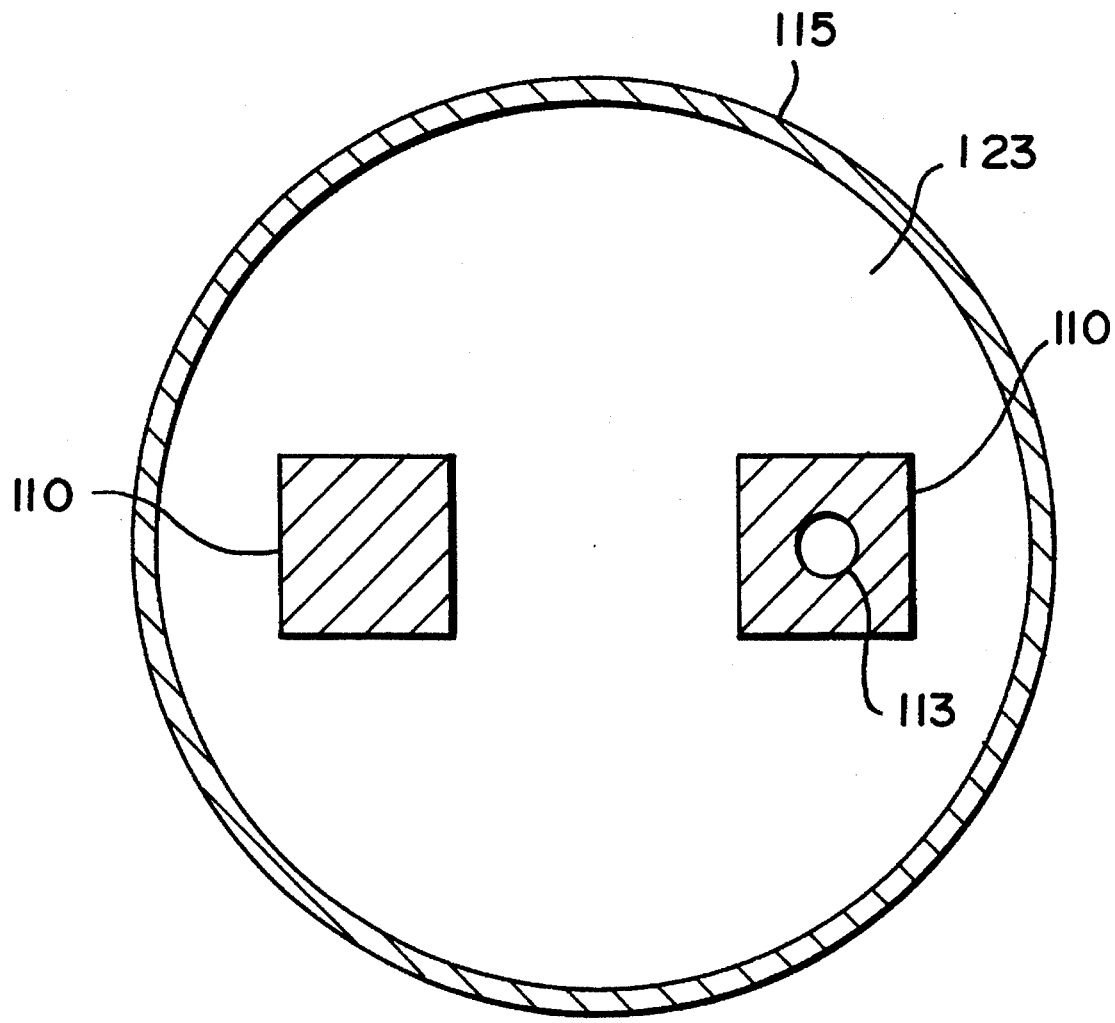
FIG. 14 is a sectional view taken along lines A—A of FIG. 5.

When downward pressure is exerted on the spray actuator 210 and thus on the stem 236 associated therewith, lowermost stem section 257 impinges upon the recessed surface 259 of the seat 231 nestled within the spring 222. This pressure on surface 259 causes tension on the spring 22 as it compresses, thus providing relief for the upper gasket, i.e., the product valve gasket 216 such that it opens due to the outward flexing of the gasket's internal diameter away from the tight radial engagement of this flat gasket with its respective circular valve stem seats as has been alluded to above. While this action permits the product to flow, simultaneously, the propellant valve cup 231 which is also a sealing seat is urged away from the propellant gasket 228 thus initiating the flow of gaseous propellant. The gas is seen to flow from the head space 238, up bore 249, around the outside of sealing seat 231, but staying under the gasket 228, and then over the wall and into the interior 259 of the cup. From here the gas flows through the V-cut on the bottom of the lowermost portion of the stem 257 up channel 214 through the venturi orifice 211 into the venturi expansion chamber 237 for ultimate movement of product as product comes out from orifice 212, then through port 212U to mix with the propellant in the expansion chamber 237. Reference is made to FIG. 13 which specifically shows the path of fluid flow for both product and propellant.

The valve spring 222 also serves to urge the valve stem 236 into a closed position by retraction when finger pressure is released. Simply restated, the spring acts as a countercurrent force to close the propellant valve cup 231 up against its gasket 228 at the seal point 261, which seal point is denoted in FIG. 9, the valve open view. This action simultaneously closes the product valve gasket 216 again, as per FIG. 8.

Simultaneous to the valve action just described, a third valve function occurs at sealing point 239. This seal opens due to the downward flex of the gasket 216 whereby air from the atmosphere is permitted to flow through breathing channel 215 as per FIG. 9, down along the side of the core 240 and out the orifice 217 situated near the top of the housing 235, per FIG. 8 into the headspace 260 above the product 230. (See left side of FIG. 8) The purpose for this inflow of air is to maintain a neutral pressure i.e., atmospheric pressure as product is evacuated in use.

It is seen that in the third embodiment of this invention, that the design employed provides a unique valve seal loading system which is made possible by the floating core structure. By the term floating core, is intended to convey the concept that the core is spaced upwardly from the bottom of the container for the product, is the housing. In order for the valve seals for both the product and propellant to function effectively, a tight axial compression must be maintained on both gaskets. Normally this is difficult to accomplish over a long period of time, as the sealing efficiency of valve seals erodes over time. However, by providing an upward biasing force on the core itself, a tight long lasting seal can be achieved.

This upward force is achieved, in the range of 15 to 20 lbs of pressure by utilizing different areas for each of the two pistons. By making the diameter and the corresponding area of the lower piston approximately 15% smaller than that of the upper piston, the average propellant pressure within the housing results in a net upward force within the range recited on the core. This force being exerted assures a continuous assembly squeeze on the gasket seals regardless of any dimensional changes that may affect the abutting surfaces of such mating parts as the cap and the core itself.

As can be seen from FIGS. 10 and 8, in that order, the core 240 fits into its cylindrical housing 235 which in turn is disposed within a container or bottle 233 to be closed off by a threaded cap, 218 which has a central opening 254 therein for the valve stem actuator assembly previously discussed.

The structure of the apparatus is assembled by the pressure fitting of the various components together to provide an integrated assembly. In FIG. 10, it is seen that the apparatus 200 includes the core 226 having spaced parallel tenons 234A and 234B disposed within the cylindrical propellant housing 235, which is open at its top and bottom. O-rings 232 and 237, per FIG. 8, form a hermetic seal between the core 240 and the interior surface of the housing 235. The cap 218 is snapfit by the interlocking of the outward extending edge 219 of the housing 235 past the angled boss 219A of the cap.

Such a construction permits one to utilize a single core with multiple compatible products by the mere transfer of a core in its housing, together with the threaded cap and actuator to a second container. In addition, the corollary is true. That is, the same bottle or container, can be refilled innumerable times by the counter rotation of the threads 262 of cap 218 from the bottle, with the intact removal of the core within its housing, (FIG. 9), such that new product can be added and the core and cap then being replaced. The inter-relationship of the core in its housing to the cap is discussed below.

Indeed not only can product be replaced in accordance with this invention, but more propellant can be added as well to distribute either the original load of product or a reload of product. See the section of this application entitled Recharging Spent Dispensers.

The threads 262 of cap 218 are secured to threads 263 of the container 233. To ensure a tight seal, a gasket 242 disposed on the lip of the container is recommended.

The propellant utilized in this third embodiment may be any of a wide range of liquified gases within the pressure range of between 35 psi and about 250 psi. Mention may be made of propane, butane, and isobutane among others which may be used with equal effectiveness. Propane for example has a vapor pressure at 70 degrees F. of 109 and is the preferred fluid, due to its low cost.

The container 233, having threads 263, may be made of any suitable plastic, rigid or flexible, or it may be made of metal, even relatively light gauge metal. Such selection of materials is available with this invention, because the container 235 unlike ordinary aerosol dispensers, is not required to sustain any propellant pressure because the pressure is confined within the core housing 235 dispensed within the container 233. The choice of suitable plastic for both the housing and the container will in part depend upon the nature of the product to be delivered and the nature of the propellant. Such choices are within the skill of the art.

Previously, there has been of the plastic spacer 220 disposed within chamber 243. It should be also pointed out that this spacer serves to transmit the sealing force from the valve gasket 216 through itself to the propellant gasket 228 after the cap 218 is snapfit by the interlocking of the outward extending edge 219 of the housing 235 past the angled boss 219A of the cap. Reference is made to both of FIGS. 8 and 10.

Here too, as in the discussion of the second embodiment, upon the depletion of the liquified gas propellant, the pressure within the housing is reduced such that any residual gaseous propellant is able to escape, i.e., the housing is self-evacuating when liquid propellant is used up.

A bit of explanation is in order on this topic. The propellant within the confines of the housing is in an equilibrium status. Most of the propellant is in the liquid state. Some of the propellant; namely, that which is in the head space 238 is in the gaseous state. As the actuator is depressed, propellant gas escapes from the head space and travels the path set out above to the atmosphere. This removal of a finite portion of gas lowers the pressure within the head space. Once the pressure in the head space is lower than the vapor pressure of the propellant, more liquified propellant changes state to the gaseous state until the pressure in the housing of the propellant increases to become equal to the propellant's vapor pressure. This procedure continues for as long as the actuator is depressed or until the unit runs out of propellant, at which time it stops. This procedure transpires due to the enthalpy and the internal energy of vaporization.

Because of the fact that the liquid propellant is changed to a gaseous state internally within the housing, one finds that what is coming out of the actuator with this invention is a gas-liquid mixture, i.e., gaseous propellant, liquid or misted (fine droplets) of product. Whereas in the conventional aerosol dispenser, the mix being emitted from the spray head actuator is a liquid—liquid mix, wherein the propellant is in the liquid phase and the product is in the liquid phase, and then once in the air, the propellant changes state and gasifies and disappears.

Thus through extensive testing it has been found that the apparatus 200 is about 3 times more efficient than the conventional aerosol in product delivery. That is, 1 gram of propellant can deliver 10 grams of water based product (hair spray) whereas 3 grams of propellant are required for the same product delivery conventionally. This is a significant ecological benefit.

The fluid flow of both the propellant and the product have been described previously. Reference is made to FIG. 13. Suffice it point out currently that as the propellant flows out the propellant orifice 211 into the expansion chamber 237, a vacuum is created such that the product is sucked out of element 212 via orifice 212U into the venturi chamber 237 such that both are delivered together into the atmosphere.

Recharging Spent Dispensers

A further benefit of the apparatus of this invention is the ability to recycle the unit for further use in like manner. Thus reference is made to FIGS. 7 and 11 here the invention further provides the user with a simple and convenient means of recharging the spent dispenser with new propellant from a mother canister. In this process, the spray head actuator 101 of FIG. 7 and 210 in the FIG. 8 embodiment is removed from its container. The threaded cap is unscrewed from the product container, while remaining engaged to the propellant housing, to reveal the balance of housing 135, 235 for observation and handling. The spray stem of the housing is pressed downwardly onto the recharging canister 140, 340's special upward opening spray actuator 181, 381 respectively for a mating engagement and the transfer of propellant from the master container into the housing.

The recharging canister RC, is provided with a small amount of air entrapped in head space at 141 or 341 respectively. The effect of this entrapped air is to elevate the vapor pressure of the propellant by a factor of 8 to 10 PSI. This higher pressure in the recharge canister, as opposed to the lower pressure existing in the spent dispenser housing, facilitates the flow of liquid propellant 143 up through the dip tube 142, 342 and into the dispenser housing chamber 117, 233 via respectively each of which represents the detailed propellant delivery means described in detail with respect to FIGS. 5 and 8. Designators 124 and 324 of FIGS. 7 and 11 respectively depict propellant being transferred in from the master recharge container RC in the propellant storage areas previously described in detail.

In order to ensure optimum fluid transfer flow, the device 200, or the housing 235, (whichever way refill is being carried out, the latter as per FIG. 11) should be at least 10° F. lower in temperature than the recharger cylinder. Approximately 20–30 seconds will expire for the transfer of two fluid ounces of propellant. After the propellant transfer is completed, the two units are disengaged, the actuator tip reapplied to the device, and assuming only the housing was originally connected to the recharger, it is repositioned within the same container of liquid product or into another container of liquid as may be desired.

Several benefits derive from the recharging capability of the invention. Economy of product delivery is perhaps the foremost benefit. About six rechargings are provided by a sixteen ounce recharging canister, which equals approximately six typical aerosol containers in volume. Another advantage of the invention in its broad compatibility with any type of liquid product, water or solvent-based. One dispenser assembly may be used with three or four different products simply by removing the storage cap and exchanging the dispenser assembly in its place.

Since certain changes may be made in the above apparatus without departing from the scope of the invention herein involved, it is intended that all matter contained in the above description and shown in the accompanying drawings shall be interpreted as illustrative and not in a limiting sense.

I claim:

1. A reusable and rechargeable propellant activated liquid dispensing apparatus comprising:
   (a) a liquid container having a product storage area;
   (b) a propellant housing sealed in said container, said housing having a propellant storage area therein, within which is disposed a core, which core includes a pair of spaced pistons, an upper piston and a lower piston,
   (c) a discharge head, which functions as a spray actuator, and which head includes:
      (I) means forming a venturi flow passageway in and opening from said discharge head, which means is adapted for fluid communication with both of,
      (II) a first channel for propellant delivery
         said first channel in fluid communication with said propellant housing, and
      (III) a second channel for product delivery;
         said second channel in fluid communication with the product storage area of said liquid container.
   (d) a spray stem carrying a pair of flexible gaskets, (I) a product gasket and (II) a propellant gasket, said stem secured to said liquid container, and being in fluid communication with said discharge head, and with said first and second channels, wherein
   the flow from said product storage area through said second channel is closed off by the product gasket, and the flow from said propellant storage area is closed off by the propellant gasket,
   whereby when said flexible gaskets are flexed by actuation of said discharge head, both propellant and product can be delivered to said discharge head.

2. In the apparatus of claim 1 wherein the lower piston is of a smaller diameter than the upper piston.

3. In the liquid dispensing apparatus of claim 1 wherein the means forming the venturi flow passageway in said discharge head comprises a venturi expansion chamber, in and opening from said discharge head, in fluid communication with a propellant acceleration chamber.

4. In the liquid dispensing apparatus of claim 1, wherein the venturi expansion chamber and the acceleration taken together form a vacuum creating means;
   whereby when the path for flow of propellant is opened, propellant is delivered by a release of pressure, and said propellant accelerates through said acceleration chamber, such that a vacuum is formed which draws liquid product present in the storage area to said venturi expansion chamber for delivery.

5. In the liquid dispensing apparatus of claim 1, further including means (e) to allow air to enter the product storage area of said container to maintain a neutral atmospheric pressure on the liquid product as it is withdrawn.

6. In the liquid dispensing apparatus of claim 5, wherein the means to allow air to enter the product storage area is a valve, the impact of which upon a gasket causes said gasket to flex thereby permitting air to flow into said product storage area.

7. In the apparatus of claim 1, further including means for adjusting the rate of product delivery.

8. In the apparatus of claim 1, wherein one piston is biasable by the pressure of propellant when present within said propellant housing against a cap to seal said gasket.

9. In the apparatus of claim 1 wherein the spray stem has two different cross sections, and has a channel therethrough for propellant delivery, the entry to which is sidewardly disposed.

10. In the apparatus of claim 1 wherein the spray stem has three different cross sections, and has a channel therethrough for propellant delivery, the entry to which is vertically disposed.

11. In the apparatus of claim 6 further including a spring to resist said pressure, which spring, upon expiration of said propellant is freed from pressure, such that said spring can force said piston away from said cap and open said gasket for venting said propellant.

12. In the apparatus of claim 9, wherein said pair of gaskets comprise valves actuateable upon movement of said discharge head, passage of said propellant is permitted to transpire prior to the delivery of product.

13. In the apparatus of claim 10, wherein said pair of gaskets comprise valves actuateable suitably upon movement of said discharge head, passage of said propellant is permitted to transpire simultaneously with the delivery of product.

14. In the apparatus of claim 1 wherein said apparatus's core includes a chamber and a bore,
   wherein the chamber extends downwardly into the core from the top thereof, and the chamber includes a centrally disposed throat of an intermediate lesser cross section that depends downwardly and which in turn communicates with a downwardly depending depression of a still lesser cross section, said depression being in fluid communication with said bore for fluid communication to the storage area for said propellant.

15. In the apparatus of claim 14, wherein said propellant gasket is disposed within said throat, and
   a coil spring having a sealing seat which serves as a propellant valve shut off means, mounted thereon is disposed in said depending depression.

16. In the apparatus of claim 15, wherein a seal gasket spacer having both an interior and a central opening adapted to receive said spray stem, and also having a passageway for product delivery, is disposed in said chamber.

17. In the apparatus of claim 16, wherein the interior of said spacer and said chamber are in fluid communication via said passageway, and said chamber is in further fluid communication with the product storage area of said container.

18. In the apparatus of claim 14, wherein said core further includes a pair of tenons, one which includes a product feed channel that serves as a means of fluid communication between said chamber and the product storage area of said container.

19. A reusable and rechargeable propellant activated liquid dispensing apparatus comprising:
   (a) a liquid container having a product storage area;
   (b) a propellant housing removably disposed in said container, said housing having a propellant storage area therein, within which housing is disposed a core,
      which core comprises a pair of spaced parallel tenons and a chamber, wherein the chamber extends downwardly into the core from the top thereof, and the chamber includes a centrally disposed throat of an lesser cross section that depends downwardly,
      spring loaded means disposed therein in fluid communication with said storage area, said spring loaded means adapted to deliver propellant from said storage area upon the urging of a spray stem; and wherein
      said tenons include an upper piston and a lower piston at opposite ends thereof, one of said tenons having a channel therein in fluid communication with said product storage area;
   (c) a threaded cap threadedly engaged to said container;

(d) a spray stem disposed through said cap into said housing and adapted to cooperate with said spring loaded means for delivery of propellant, and said spray stem being in fluid communication with the channel in one of said tenons for delivery of product.

20. The apparatus of claim 19 further including a spray actuator fluidly connected to said spray stem for delivery of both product and propellant.

21. In the apparatus of claim 19 wherein the lower of said pistons is of a lesser cross-section than the upper of said pistons.

22. The apparatus of claim 19 wherein said housing has an inner surface and each piston forms a hermetic seal with said inner surface, and further wherein said chamber has a product gasket mounted on said spray stem disposed across the top thereof.

23. The apparatus of claim 19 wherein the container, upon removal of the cap and housing therefrom can have its product storage area reloaded with the same or different product.

24. The apparatus of claim 19 wherein the threaded cap also engages said housing, retains said housing within said container, and upon unthreading of said cap from said container, said housing remains engaged to said cap.

25. The apparatus of claim 22 wherein the product gasket is interposed beneath said threaded cap, across the top of said chamber.

26. The apparatus of claim 19 wherein the housing, upon removal from said container, can be recharged with propellant through the spray stem.

27. A reusable and rechargeable propellant activated liquid dispensing apparatus comprising:

(a) a liquid container having a product storage area;

(b) a propellant housing removably disposed in said container, said housing having a propellant storage area therein, (c) a spray stem having a pair of fluid conduits therethrough, (d) a discharge head, which functions as a spray actuator, and which head includes:

(I) means forming a venturi flow passageway in and opening from said discharge head, which means is adapted for fluid communication with both of, (II) a propellant acceleration chamber, which in turn is in fluid communication with a first channel for propellant delivery, said first channel being in fluid communication with said propellant housing, and (III) and a fluid conduit in said spray stem which in turn is in fluid communication with a second channel for product delivery;

said second channel being in fluid communication with the product storage area of said liquid container;

the flow from each of said product storage area and from said propellant storage area being closed off by separate flexible gaskets.

28. The apparatus of claim 27 wherein said flexible gaskets are flexed by actuation of said spray stem by said discharge head, and said flexing controls the flow of both product and propellant.

29. The apparatus of claim 27 including a threaded cap threadedly engaged to said container and wherein the threaded cap also engages said housing, retains said housing within said container, and upon unthreading of said cap from said container, said housing remains engaged to said cap.

30. The apparatus of claim 29 wherein the flow of product from said product storage area, through said second channel physically passes through said propellant storage area, but isolated from any propellant in said propellant storage area.

31. The apparatus of claim 1 wherein the flow of product from said product storage area, physically passes through said propellant storage area, but isolated from any propellant in said propellant storage area.

32. The apparatus of claim 27 further comprising a pair of pistons disposed in a sleeve with sealing means at each end of said sleeve such that said piston disposed in said sleeve forms said propellant storage housing, which propellant storage housing is hermetically sealed.

33. In the apparatus of claim 22 wherein the inner surface of the housing includes first and second stepped zones to thereby create a housing having three distinct cross sectional diameters.

34. In the apparatus of claim 33 wherein the lower piston is disposed in the narrowest diameter of said housing and the upper piston is disposed at the widest diameter of said housing.

35. In the apparatus of claim 19 wherein said cap also engages said housing, and the elevation of said housing when so engaged is in a disposition spaced up from the container.

36. The apparatus of claim 27 wherein the inner surface of the housing includes first and second stepped zones to thereby create a housing having three distinct cross sectional diameters and the lower piston is disposed within the narrowest diameter of said housing to hermetically seal said housing.

37. The apparatus of claim 1 wherein the container and the housing are both made of plastic.

38. The apparatus of claim 35, wherein the housing is disposed concentric to the container, and the container is made of flexible plastic.

39. The apparatus of claim 19 wherein product flow and propellant flow is controlled by the movement of a pair of gaskets, controlled by said spray stem.

* * * * *